Aug. 11, 1925.
H. D. KELLY
1,549,092
FOOD WARMING APPLIANCE
Filed March 12, 1923        2 Sheets-Sheet 2
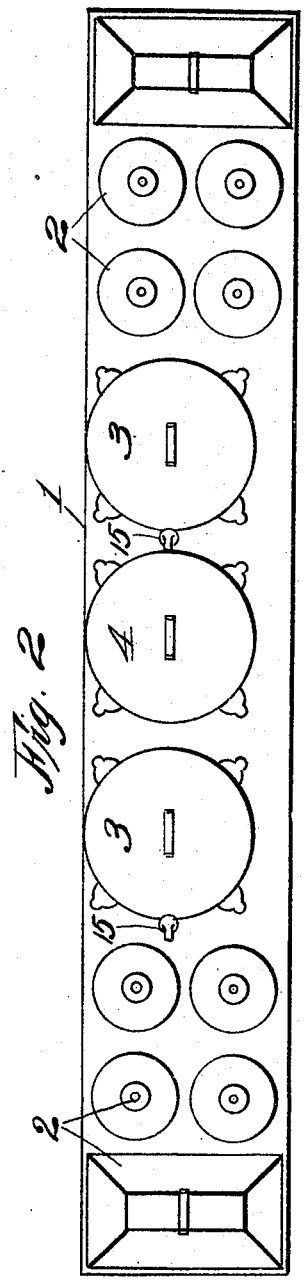
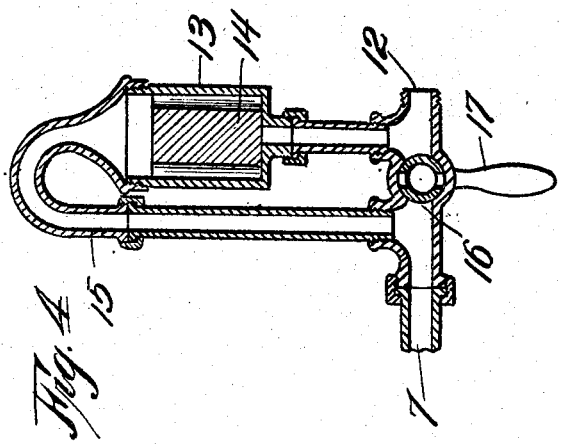
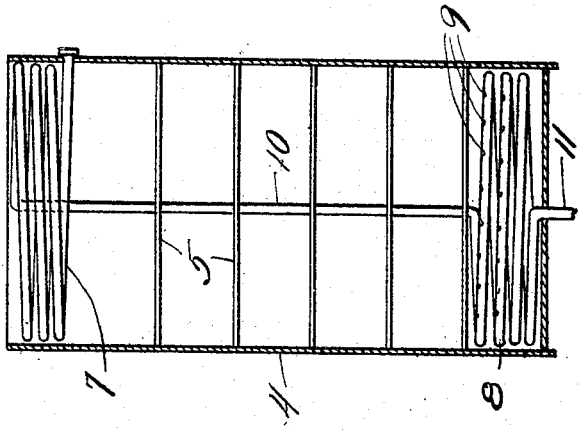
Witness:
R. E. Hamilton
Inventor:
Henry D. Kelly,
By Thorpe & Gerard
attys.

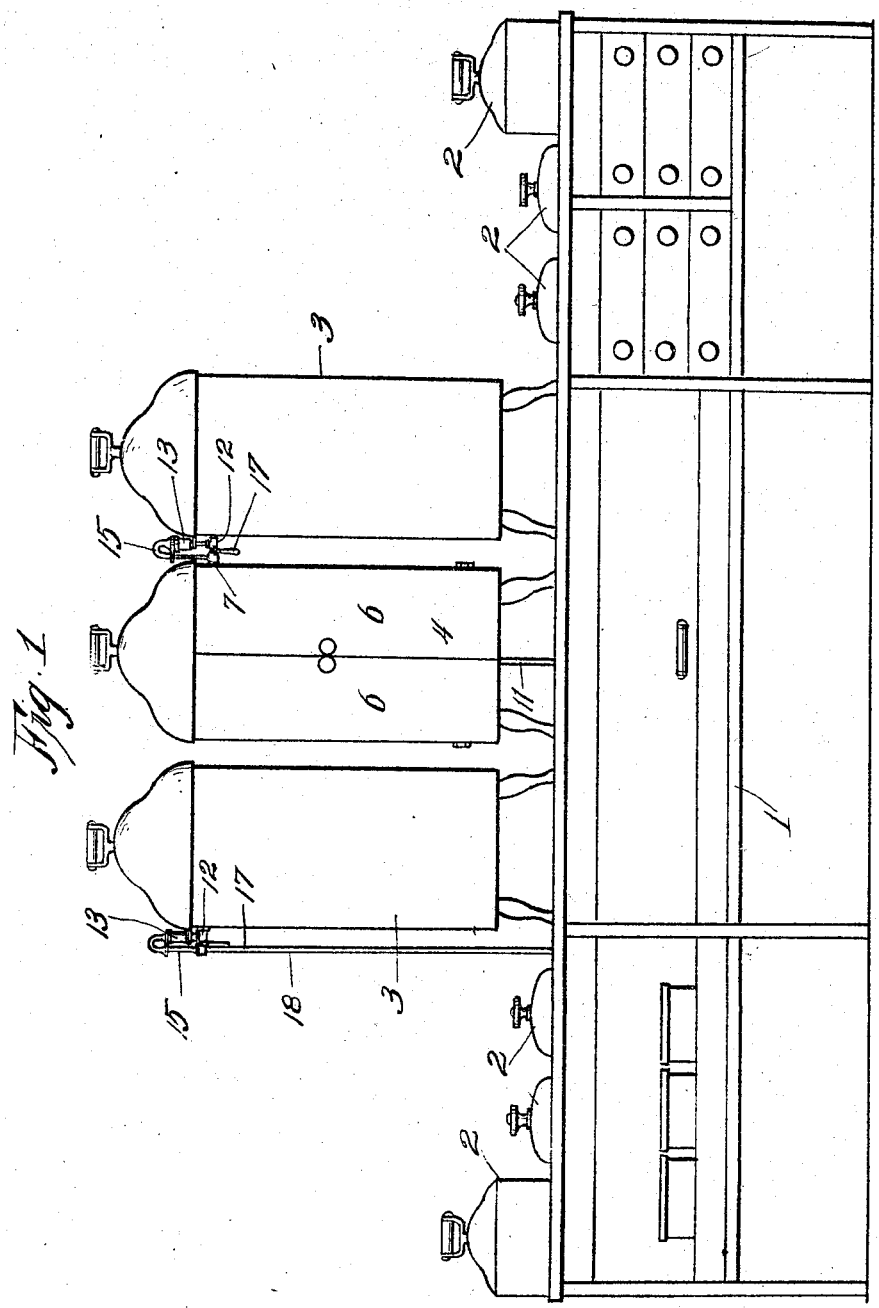

Patented Aug. 11, 1925.

1,549,092

UNITED STATES PATENT OFFICE.

HENRY D. KELLY, OF KANSAS CITY, MISSOURI.

FOOD-WARMING APPLIANCE.

Application filed March 12, 1923. Serial No. 624,476.

*To all whom it may concern:*

Be it known that I, HENRY D. KELLY, a citizen of the United States, and resident of Kansas City, county of Jackson, State of Missouri, have invented a certain new and useful Improvement in Food-Warming Appliances, of which the following is a complete specification.

This invention relates to appliances for keeping foods warm and has for its object to produce means whereby the exhaust or waste steam from a coffee urn may be utilized to accomplish the object set forth.

With this and other objects in view as hereinafter appear, the invention consists in certain novel and peculiar features of construction and organization as hereinafter described and claimed; and in order that it may be fully understood, reference is to be had to the accompanying drawings, in which:—

Figure 1 is a front view of a steam table with the warming casing and a part of coffee urns thereon;

Figure 2 is a plan view of the same;

Figure 3 is a central vertical section of the warming casing; and

Figure 4 is a central vertical section of a valve controlled pipeway forming part of the invention.

In the said drawings, 1 indicates a steam table of any suitable or preferred type, for the convenient support of receptacles wherein cooked foods are to be kept warm or hot, the said receptacles being indicated by the numeral 2, and not detailed as they form no feature of the invention.

Mounted upon the table is one or more coffee urns 3 of a type commonly used in restaurant and hotel kitchens, and 4 is a casing mounted upon the table and preferably arranged between the urns as shown. This casing is provided with a plurality of shelves or partitions 5 to which access may be had by opening doors 6, and within the casing at the upper and lower ends thereof are coils 7 and 8 respectively, coil 8 having fine perforations 9 in its upper side.

10 is a pipe connecting the coils and 11 a pipe leading from the bottom coil to the steam table and thence through coils, not shown, for keeping the receptacles 2 warm, though if desired, some of such receptacles may be kept warm by other coils, not shown.

12 is a pipe communicating with the steam chamber of one of the urns 3, and said pipe is provided with a communicating enlargement 13 wherein is arranged a gravity valve 14, closing communication between pipe 12 and enlargement 13 until steam pressure in the urn gets sufficiently high to force said valve upward from its seat.

Communicating with the upper end of the enlargement 13, is one end of the inverted U-shaped pipe 15, and the lower end of said pipe connects with the receiving end of coil 7, and also with a by-pass pipe 16 leading from pipe 12, and normally closing the by-pass is a valve 17. The other urn is provided with the mechanism illustrated by Figure 4, and differs from the latter only in the fact that the lower end of pipe 15 and the communicating end of the by-pass connect with the pipe 18, leading to a coil, not shown in the steam table, though it is obvious that pipe 18 might also communicate with the receiving end of coil 7.

The operation is as follows: As the coffee is being made and before the steam generated in either of the urns attains sufficient pressure to unseat its valve 17, the by-pass valves may be opened to permit steam to pass through the various connecting coils and thus raise the temperature of the casing 4 and the food vessels of the steam table, though generally these valves will not be opened until after the coffee has been made and the steam has attained sufficient pressure to unseat the said valve or valves, and pass thence through pipe 15 and the connections traced to the coils.

After the coffee is made as stated, only sufficient heat will be maintained to keep the water hot. At such temperature there is insufficient steam generated to raise the gravity valve or valves, and to permit the steam generated to pass through the hot coils, the by-pass valves are opened so that steam may pass through the by-passes. By this construction it is obvious that the coils may be utilized for the reception of heat from the steam which ordinarily escapes to atmosphere and that the kitchen can be conducted more economically than is the case where there is a constant waste of steam. In the casing 4, which is intended chiefly for keeping biscuit, pastry and like products warm, the escape of a limited quantity of steam through the fine perforations in coil 8 resulting in keeping the contents of said casing moist and fresh, the upper coil keeping the upper part of the casing so hot that the steam arising cannot condense on said coil near the top of the casing and then fall down, and materially wet or dampen the products upon the topmost shelf, it being understood that no large volume of steam escapes into said casing and what little does stand in the casing escapes, in a large measure, because of the frequent opening of the doors 6.

From the above description it will be apparent that I have produced an appliance embodying the features of advantage enumerated as desirable and which is susceptible of modification in minor particulars without departing from the spirit and scope of the appended claims.

I claim:

1. In a food warming appliance, the combination with a casing containing a top coil, a bottom coil and a pipe connecting said coils, the bottom coil having orifices for the escape of jets of steam into the casing, of a steam supply pipe connected to the top coil, and a valve normally closing said supply pipe but adapted to open under sufficient pressure to admit steam to said coil.

2. In a food warming appliance, the combination with a casing containing a top coil, a bottom coil and a pipe connecting said coils, the bottom coil having orifices for the escape of jets of steam into the casing, of a steam supply pipe connected to the top coil, a valve normally closing said supply pipe but adapted to open under sufficient pressure to admit steam to said coil, and a manually operable valve controlled by-pass around the first-named valve.

3. In a food warming appliance, the combination with a casing containing a top coil, a bottom coil and a pipe connecting said coils, the bottom coil having orifices for the escape of jets of steam into the casing, of a steam supply pipe connected to the top coil, a valve normally closing said supply pipe but adapted to open under sufficient pressure to admit steam to said coil, and a valve-controlled by-pass extending around the first-named valve whereby steam may be permitted to pass to the coils when the first-named valve is seated.

In witness whereof I hereunto affix my signature.

HENRY D. KELLY.